US009491031B2

(12) United States Patent
Satterlee et al.

(10) Patent No.: US 9,491,031 B2
(45) Date of Patent: Nov. 8, 2016

(54) DEVICES, METHODS, AND COMPUTER READABLE STORAGE DEVICES FOR COLLECTING INFORMATION AND SHARING INFORMATION ASSOCIATED WITH SESSION FLOWS BETWEEN COMMUNICATION DEVICES AND SERVERS

(71) Applicant: AT&T Intellectual Property I, L.P., Atlanta, GA (US)

(72) Inventors: Michael J. Satterlee, Clifton Park, NY (US); Dustin Grant, Fall City, WA (US); Sandeep Gupta, Milpitas, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 199 days.

(21) Appl. No.: 14/271,290

(22) Filed: May 6, 2014

(65) Prior Publication Data
US 2015/0326660 A1    Nov. 12, 2015

(51) Int. Cl.
*H04L 29/08* (2006.01)
*H04L 29/06* (2006.01)
*H04L 12/851* (2013.01)

(52) U.S. Cl.
CPC ............ *H04L 29/06* (2013.01); *H04L 29/08* (2013.01); *H04L 67/1095* (2013.01); *H04L 67/14* (2013.01); *H04L 67/42* (2013.01); *H04L 47/2483* (2013.01)

(58) Field of Classification Search
CPC ....... H04L 45/38; H04L 45/64; H04L 45/42; H04L 45/02; H04L 45/00; H04L 45/24; H04L 45/16; H04L 45/302; H04L 41/12; H04L 47/2441; H04L 47/10; H04L 61/103; H04L 63/20; H04L 67/1095; H04L 67/42; H04L 67/14; H04L 29/06; H04L 29/08; H04W 40/00; H04W 92/02
USPC ........ 370/235, 400, 254, 236, 252; 709/223, 709/238, 220, 224, 228, 244, 245, 203, 709/217–219; 726/3
See application file for complete search history.

(56) References Cited

U.S. PATENT DOCUMENTS

| 4,972,504 A | 11/1990 | Daniel et al. |
| 5,331,544 A | 7/1994 | Lu et al. |

(Continued)

FOREIGN PATENT DOCUMENTS

| WO | 2006059343 | 6/2006 |
| WO | 2007048008 | 4/2007 |

OTHER PUBLICATIONS

Li et al. "Business intelligence approach to supporting strategy-making of ISP service management", ScienceDirect 35:739-754 (2008).

(Continued)

*Primary Examiner* — Alina N Boutah
(74) *Attorney, Agent, or Firm* — Hartman & Citrin LLC

(57) ABSTRACT

Information associated with session flows between communication devices and servers is collected and shared. A request is generated for data having predefined attributes within session flows occurring between multiple communication devices and a server over a communication network. The request is sent to a controller having access to information indicating network elements within the communication network traversed by the session flows. The controller selects a network element from among the network elements traversed by the session flows and retrieves the data from the selected network element.

22 Claims, 3 Drawing Sheets

(56) References Cited

U.S. PATENT DOCUMENTS

| | | | |
|---|---|---|---|
| 5,490,060 | A | 2/1996 | Malec et al. |
| 6,324,541 | B1 | 11/2001 | de l'Etraz |
| 7,165,037 | B2 | 1/2007 | Lazarus et al. |
| 7,236,950 | B2 | 6/2007 | Savage et al. |
| 7,512,627 | B2 | 3/2009 | Hossfeld et al. |
| 8,055,548 | B2 | 11/2011 | Staib et al. |
| 8,175,908 | B1 | 5/2012 | Anderson |
| 8,214,246 | B2 | 7/2012 | Springfield et al. |
| 8,306,846 | B2 | 11/2012 | Tavares et al. |
| 8,401,924 | B1 | 3/2013 | Rajyaguru et al. |
| 8,787,154 | B1 * | 7/2014 | Medved ............... H04L 45/64 370/225 |
| 8,842,578 | B1 * | 9/2014 | Zisapel ............... H04L 43/045 370/255 |
| 8,964,563 | B2 * | 2/2015 | Jocha ................. H04L 43/026 370/235 |
| 9,038,151 | B1 * | 5/2015 | Chua .................. H04L 45/42 709/223 |
| 9,119,109 | B1 * | 8/2015 | Dubrovsky ........... H04W 28/16 |
| 2002/0082920 | A1 | 6/2002 | Austin et al. |
| 2002/0120554 | A1 | 8/2002 | Vega |
| 2003/0065521 | A1 | 4/2003 | Goodwin |
| 2004/0215599 | A1 | 10/2004 | Apps et al. |
| 2007/0156673 | A1 | 7/2007 | Maga et al. |
| 2008/0033857 | A1 | 2/2008 | Moses |
| 2008/0208910 | A1 | 8/2008 | MacIntyre et al. |
| 2009/0048884 | A1 | 2/2009 | Olives et al. |
| 2010/0306029 | A1 | 12/2010 | Jolley |
| 2011/0261722 | A1 * | 10/2011 | Awano ............... H04L 45/34 370/254 |
| 2012/0093158 | A1 * | 4/2012 | Chiba ................. H04L 45/38 370/392 |
| 2013/0003745 | A1 * | 1/2013 | Nishimura .......... H04L 12/4641 370/400 |
| 2013/0054761 | A1 * | 2/2013 | Kempf ................. H04L 47/781 709/220 |
| 2013/0148666 | A1 * | 6/2013 | Shimonishi ............ H04L 45/72 370/400 |
| 2013/0179241 | A1 | 7/2013 | Liu |
| 2013/0194914 | A1 * | 8/2013 | Agarwal ............... H04L 45/245 370/225 |
| 2013/0201821 | A1 * | 8/2013 | Yamato ............... H04L 41/0893 370/225 |
| 2013/0242879 | A1 * | 9/2013 | Yamato ................ H04L 45/00 370/328 |
| 2013/0246655 | A1 * | 9/2013 | Itoh ........................ H04L 12/56 709/238 |
| 2013/0250799 | A1 * | 9/2013 | Ishii ...................... H04L 45/745 370/252 |
| 2013/0304915 | A1 * | 11/2013 | Kawai ................. H04L 43/026 709/224 |
| 2013/0318243 | A1 * | 11/2013 | Chinthalapati ......... H04L 45/52 709/226 |
| 2013/0322440 | A1 * | 12/2013 | Chiba ................ H04L 49/3009 370/389 |
| 2014/0052836 | A1 * | 2/2014 | Nguyen ................. H04L 45/38 709/223 |
| 2014/0075510 | A1 * | 3/2014 | Sonoda ................ H04L 63/105 726/3 |
| 2014/0098669 | A1 * | 4/2014 | Garg ..................... H04L 47/12 370/235 |
| 2014/0133492 | A1 * | 5/2014 | Takajo .................. H04L 45/22 370/401 |
| 2014/0153572 | A1 * | 6/2014 | Hampel ............. H04L 12/6418 370/392 |
| 2014/0201761 | A1 * | 7/2014 | Dalal .................... H04L 47/193 718/108 |
| 2014/0211661 | A1 * | 7/2014 | Gorkemli ................ H04L 41/12 370/255 |
| 2014/0269403 | A1 * | 9/2014 | Anghel ............... H04L 43/0817 370/253 |
| 2014/0269435 | A1 * | 9/2014 | McConnell ......... H04L 12/1432 370/259 |
| 2014/0280547 | A1 * | 9/2014 | DeCusatis ............... H04L 67/34 709/204 |
| 2014/0280715 | A1 * | 9/2014 | Raniere ................... H04L 67/36 709/217 |
| 2014/0280864 | A1 * | 9/2014 | Yin ........................ H04L 41/12 709/224 |
| 2014/0286177 | A1 * | 9/2014 | Ni ......................... H04L 43/026 370/250 |
| 2014/0286336 | A1 * | 9/2014 | Narayanan .............. H04L 45/38 370/392 |
| 2015/0055508 | A1 * | 2/2015 | Ashida ................... H04L 45/00 370/254 |
| 2015/0092551 | A1 * | 4/2015 | Moisand ............. H04L 12/4633 370/235 |
| 2015/0134842 | A1 * | 5/2015 | Sampath ................ H04L 45/22 709/228 |
| 2015/0326524 | A1 * | 11/2015 | Tankala ................ H04L 61/103 709/245 |
| 2015/0372902 | A1 * | 12/2015 | Giorgetti ................ H04L 45/64 370/219 |

OTHER PUBLICATIONS

Ghosh et al. "Mashups for Semantic User Profiles", WWW 2008/ Poster Paper, pp. 1229-1230 (Apr. 21-25, 2008).

Shaw et al. "Knowledge management and data mining for marketing", Decision Support Systems, 31:127-137 (2001).

Sezer et al. "Are we ready for SDN?—Implementation Challenges for Software-Defined Networks", Communications Magazine, IEEE 51.7, pp. 1-13 (2013).

* cited by examiner

DEVICES, METHODS, AND COMPUTER READABLE STORAGE DEVICES FOR COLLECTING INFORMATION AND SHARING INFORMATION ASSOCIATED WITH SESSION FLOWS BETWEEN COMMUNICATION DEVICES AND SERVERS

TECHNICAL FIELD

The present disclosure relates generally to communication and, more particularly to collection of information related to web usage of communication devices.

BACKGROUND

Currently, custom web applications are used to gather relevant business information for on-line web stores. These applications typically require a user to log in to his or her account via a web server. Business information associated with a user is tracked by examining the user's browsing history for a particular on-line account.

For example, business information concerning usage of a particular home improvement business having an on-line store, such as Lowe's®, is captured for users having an established on-line account with that store. This information may be made available to Lowe's®. Business information available to another home improvement business having an on-line store, such as Home Depot® may be captured similarly for users having an established on-line account with that store, and such information may be made available to Home Depot®.

Collecting business information in this manner limits the usefulness of the business information. In particular, the business information captured is only made available to the store with which the user has a web account. Thus, for example, business information captured for users having on-line accounts with Lowe's® is not made available to Home Depot®, and vice versa.

Applications are available that collect business information by tracking the browsing history associated with a user's device. However, if the user switches to other devices, there is no way to track the browsing history of the user across the various devices. Further, such applications typically require downloading of software onto a user's device to perform such tracking. Depending upon the device settings, the device may treat the software as malware and reject downloading it. In addition, such applications are specific to a vendor, such that the collected business information is only available to the vendor providing the tracking application.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

Another illustrative embodiment a method is provided for collecting and sharing information associated with session flows between communication devices and servers. The method includes generating, by a processor, a request for data having predefined attributes within session flows occurring between multiple communication devices and a server over a communication network. The method further includes sending the request to a controller having access to information indicating network elements within the communication network traversed by the session flows. The controller selects a network element from among the network elements traversed by the session flows and retrieves the data from the selected network element, and the retrieved data is received from the controller.

According to another illustrative embodiment is provided for collecting and sharing information associated with session flows between communication devices and servers. The device includes a processor and a memory. The memory has instructions stored thereon which, when executed by the processor, cause the processor to perform operations. The operations include generating a request for data having predefined attributes within session flows occurring between multiple communication devices and a server over a communication network and sending the request to a controller having access to information indicative of network elements within the communication network traversed by the session flows. The controller selects a network element from among the network elements traversed by the session flows and retrieves the data from the selected network element, and the retrieved data is received from the controller.

According to another illustrative embodiment, a computer readable storage device has instructions stored thereon which, when executed by a processor, cause the processor to perform operations for collecting and sharing information associated with session flows between communication devices and servers. The operations include generating a request for data having predefined attributes within session flows occurring between multiple communication devices and a server over a communication network and sending the request to a controller having access to information indicative of network elements within the communication network traversed by the session flows. The controller selects a network element from among the network elements traversed by the session flows and retrieves the data from the selected network element. The retrieved data is received from the controller.

DETAILED DESCRIPTION

Figure 1:
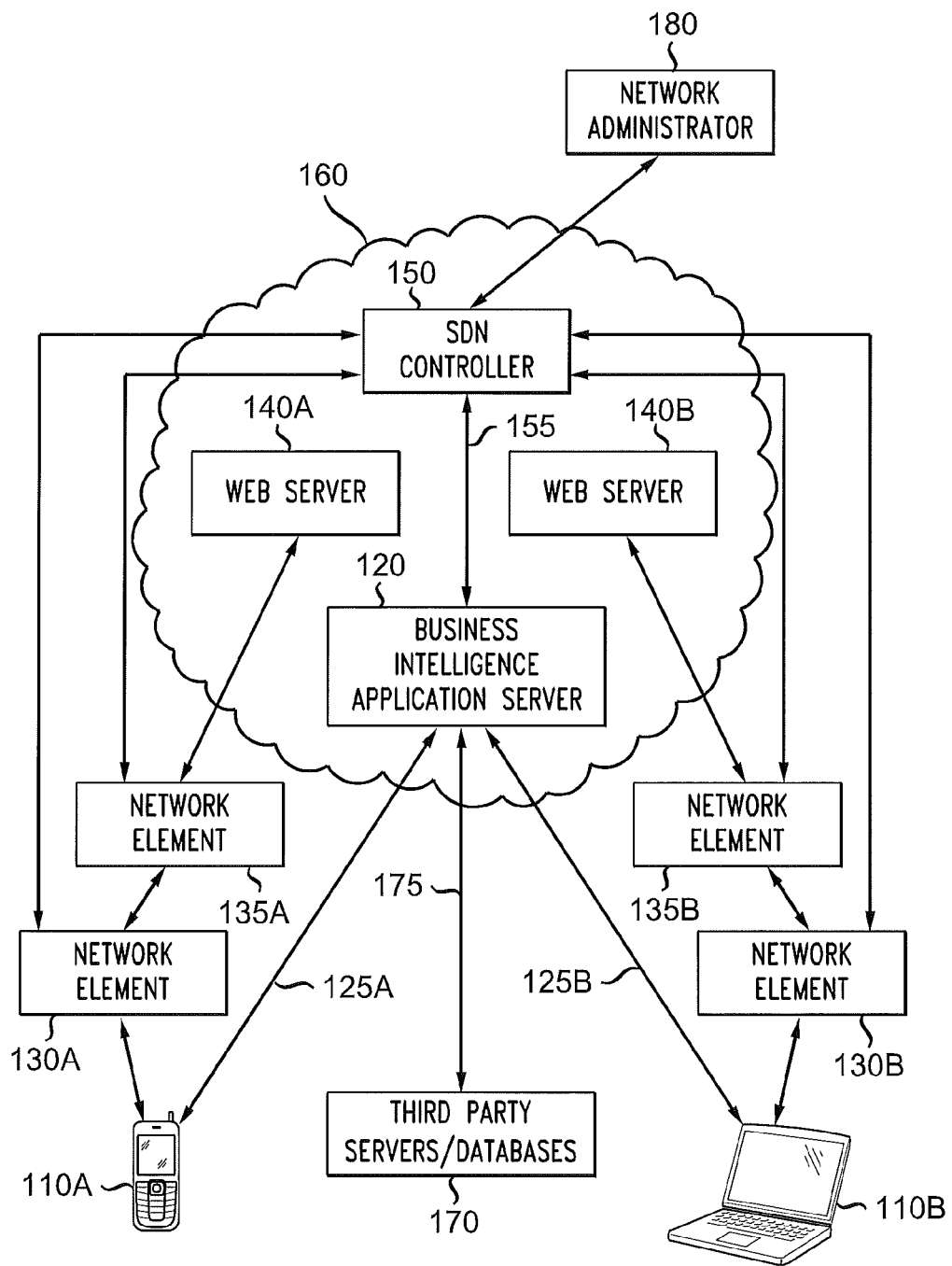
FIG. 1 illustrates a system for collecting and sharing information associated with session flows between communication devices and servers according to an illustrative embodiment.

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, a configurable, distributed and real-time business intelligence application is provided for collecting business information associated with session flows between communication devices and web servers. It should be appreciated that the terminology "web server" includes not only servers on the "world wide web" but any server hosting a website with which communication devices can communicate and participate in data session flows via a network, such as the Internet.

The embodiments described herein allow for the gathering of business information based on the network activity of multiple users across different networks and different user communication devices. As used herein, the terminology "business information" may include any information that may be relevant to a business concerning a user's network activities, such as user identity, user location, and user browsing history including web sites visited and the duration of each visit as well as products and services viewed. Additionally, though the description is directed to the collection of "business" information, it should be appreciated that the techniques described herein may be used to collect information regarding user web activity that is not related to a business concern, e.g., information that may be related to a security concern, a charitable concern, etc.

The business intelligence application described herein leverages Software Defined Networking (SDN) technology to collect business information. SDN is an emerging technology that allows for the abstraction of network forwarding devices that are distributed throughout a network from a management and control function, allowing the management and control function to be centralized. SDN allows network administrators to have programmable central control of network traffic via a central controller without requiring physical access to the network elements through which the network traffic flows. The central controller, referred to as a SDN controller, may tap into the network elements through which traffic flows to provide for control of traffic flow.

A goal of SDN is to allow network engineers and administrators to respond quickly to changing business requirements. In a software-defined network, a network administrator can shape traffic from a centralized control console without having to touch individual switches. The administrator can change a network element's rules when necessary. Thus, the network administrator can prioritize, de-prioritize or even block specific types of packets from flowing through a network with a very granular level of control.

While SDN technology is currently available, it is largely focused on high-scale, high-density data center networks. According to illustrative embodiments, SDN technology is made use of outside of the data center network environment and applied throughout other networks, such as campus networks, corporate networks, Wide Area Networks (WAN), branch networks, cellular networks, the Internet, and combinations of different networks.

According to illustrative embodiments, the network tapping capabilities that are evolving within the SDN framework are leveraged to allow a business intelligence application to request data having predefined attributes within session flows that are established between user communication devices and web servers. In addition, the same network tapping primitives may be used to obtain additional information from within session flows using deep-packet inspection functions on network elements through which the network traffic is flowing.

Referring now to the figures, FIG. 1 illustrates a system for collecting and sharing information within session flows between communication devices and web servers according to an illustrative embodiment. A business intelligence application server 120 is in communication with an SDN controller 150 via, e.g., an Internet connection 155. The business intelligence application server 120 and the SDN controller 150 may be implemented with computing devices, such as that described below with reference to FIG. 2. The business intelligence application server 120 and the SDN controller 150 may be included within a network 160, such as the Internet or a cloud computing network.

The business intelligence application server 120 is also in communication with user communication devices 110A and 110B. To address privacy concerns associated with the technique described herein, the users of the communication device 110A and 110B may be provided with an option to "opt in" to having their web session flows monitored by communicating with the business intelligence application server 120.

The connections between the communication devices 110A and 110B and the business intelligence application server 120 may be e.g., wired or wireless Internet connections 125A and 125B, respectively. The business intelligence application server 120 may also be in communication with the communication devices 110A and 110B via a combination of network connections, e.g., a cellular network and the Internet.

Although the communication devices 110A and 110B are depicted as a mobile phone and a personal computer, respectively, it should be appreciated that the communication devices may include any user communication device, e.g., a personal digital assistant (PDA), a tablet, or any other communication devices capable of communicating with a web server. Also, although only two communication devices 110A and 110B are shown in FIG. 1 for simplicity of illustration, it should be appreciated that the disclosure is applicable to any number of communication devices.

The communication device 110A is in communication with a web server 140A via network elements 130A and 135A. Similarly, the communication device 110B is in communication with a web server 140B via network elements 130B and 135B. The network elements 130A, 130B, 135A and 135B may include any network element through which network traffic flows between the web servers 140A and 140B and the communication devices 110A and 110B, respectively. For example, the network elements 130A, 130B, 135A and 135B may include switches within cellular networks, gateways between cellular networks and the Internet, etc. Also, although depicted as being outside the network 160, the network elements 130A, 130B, 135A and 135B may also include network elements within the network 160, such as servers or other components through which network traffic flows between the communication devices 110A and 110B and the web servers 140A and 140B, respectively.

The network elements 130A and 135A may belong to the same or a different network than the network elements 130B and 135B. Similarly, the web servers 140A and 140B may belong to the same network or different networks.

The business intelligence application server 120 is in communication with third party servers and databases 170 via, e.g., a connection 175, such as an Internet connection. The third party servers and databases 170 may be associated with, e.g., merchants having on-line stores, merchants not having on-line stores, web service providers, government entities, etc.

As mentioned above, the business intelligence application server 120 is also in communication with the SDN controller 150 via, e.g., an Internet connection 155. According to an illustrative embodiment, the business intelligence application Server 120 initiates requests to the SDN controller 150 for data having predefined attributes within session flows between the communication devices 110A and 110B and the web servers 140A and 140B, respectively. The business intelligence application server 120 initiates such requests based, e.g., on inquiries from the third party server 170. Alternatively or in addition, the business intelligence application server 120 may initiate requests automatically at predefined intervals, e.g., to monitor volume of network traffic not necessarily related to a specific merchant.

The business intelligence application server 120 shares collected data obtained from within the session flows with the third party servers and databases 170 via, e.g., an application programming interface (API). Third parties, such as merchants, may use the collected data to initiate suggestions to users, promotions, etc. Other third parties, such as web service providers, may user the collected data to forecast network usage demand.

The SDN controller 150 is also in communication with the network elements 130A, 130B, 135A, and 135B and a network administrator 180. The network administrator 180 may be implemented with a computing device such as that described below with reference to FIG. 2.

The network administrator 180 controls the flow of data traffic through various network elements 130A, 130B, 135A and 135B via the SDN controller 150. That is, the SDN controller 150 selects network elements through which data traffic flows responsive to the direction of the network administer 180. Accordingly, the SDN controller 150 has knowledge of (or access to information indicative of) the network elements through which data traffic flows between the communication devices 110A and 110B and the web servers 140A and 140B, respectively at any given time.

For example, the SDN controller 150 knows that the network traffic between the communication device 110A and the web server 140A flows through the network elements 130A and 135A. Similarly, the SDN controller 150 knows that network traffic between the communication device 110B and the web server 140B flows through the network elements 130B and 135B.

The SDN controller 150 responds to requests from the business intelligence application server 120 for data having predefined attributes within session flows by selecting a network element through which network traffic is flowing during a web session to "tap" to obtain data. The SDN controller 150 is always aware of various characteristics of the traffic flow, including the source, the destination, the application type, etc. The SDN controller 150 is also aware of the network elements through which traffic is flowing. There may be multiple network elements which the SDN controller may "tap". The SDN controller 150 may select one or more network elements to "tap" based on decision criteria including, for example, proximity of a network element to a data store, performance of the network element, available tapping capacity, specific tapping capabilities of the network element, etc.

Once the SDN controller 150 selects a network element to "tap", the SDN controller 150 sets a policy in the selected network element to collect data within session flows having predefined attributes. The SDN controller 150 retrieves the collected data from the selected network element, e.g., periodically and/or in real time.

The data retrieved by the SDN controller 150 is provided to the business intelligence application server 120 periodically and/or in real time. As noted above, the business intelligence application server 120 shares the retrieved data with third party servers and databases 170. This sharing may occur periodically, in real time, or after some analysis of the data by the business intelligence application server 120, as described in further detail below.

As indicated above, the business intelligence application server 120 may request data having predefined attributes within session flows between the communication devices 110A and 110B and the web servers 140A and 140B, respectively. These predefined attributes may include, e.g., data indicating the identity of a user logged into a web session with a web server, data indicating the identity of the communication device being used, data indicating applications being used during session flows by each of the users, and the merchant browsing history of each user, including the names of the web sites visited, the length of time each website is visited, and information indicating products and/or services of each merchant viewed by the user, etc. The business intelligence applications server 120 may analyze the retrieved data to determine trends within the session flows, e.g., average durations on websites on a user-by-user basis, average duration on websites by all users, average bandwidth consumed during a web session on a user-by-user basis or for all users, etc.

As an example, the business intelligence application server 120 may request information indicating activity between the communication devices 110A and 110B and the web servers 140A and 140B related to particular merchant websites, such as a Lowe's website and a Home Depot® website. Alternatively, the business intelligence application server 120 may request information indicating activity on all home improvement websites. The business intelligence application server 120 may determine, based on the retrieved data indicating the activity on such websites, how often users of the communication devices 110A and 110B visited the websites within a given time period, how long the users spent visiting the websites, what products the user viewed, etc. If a user is spending time on multiple home improvement websites, such as the Lowe's® website and the Home Depot® website, within a short period of time, the business intelligence application server 120 may infer that the user is looking for a specific product and/or comparing prices of products. This information may be shared with merchants including not only Lowe's® and Home Depot® but also other stores carrying similar products via the third party servers and databases 170. In response, such merchants may provide suggestions for products, sales promotions, coupons, etc. to the users of the communication devices 110A and 110B, whether or not the user visited the websites associated with the merchants.

In addition to collecting data having predefined attributes from selected network elements, the SDN controller 150 may perform deep packet inspection functions on the network elements. For example, the SDN controller 150 may determine, by examining the data packets flowing through the network elements, whether there is a virus within the data, whether the data needs to be rerouted performing deep packet inspection, the amount of bandwidth being used over a given period of time, etc., This information may be provided to the network administrator 180 such that appropriate action may be taken (e.g., traffic is rerouted). This information may also be provided to the business intelligence application server 120.

Although the description above refers largely to communications occurring over the Internet, it should be appreciated that such communications may occur over other networks, e.g., a cellular network in communication with the Internet. A cellular network may operate according a protocol dictated by telecommunications standards, such as Global System for Mobile communications (GSM) and a Universal Mobile Telecommunications System (UMTS). It should be understood, however, that such communications may also occur using wireless networks that use any existing or yet to be developed telecommunications technology. For example, some other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

Figure 2:
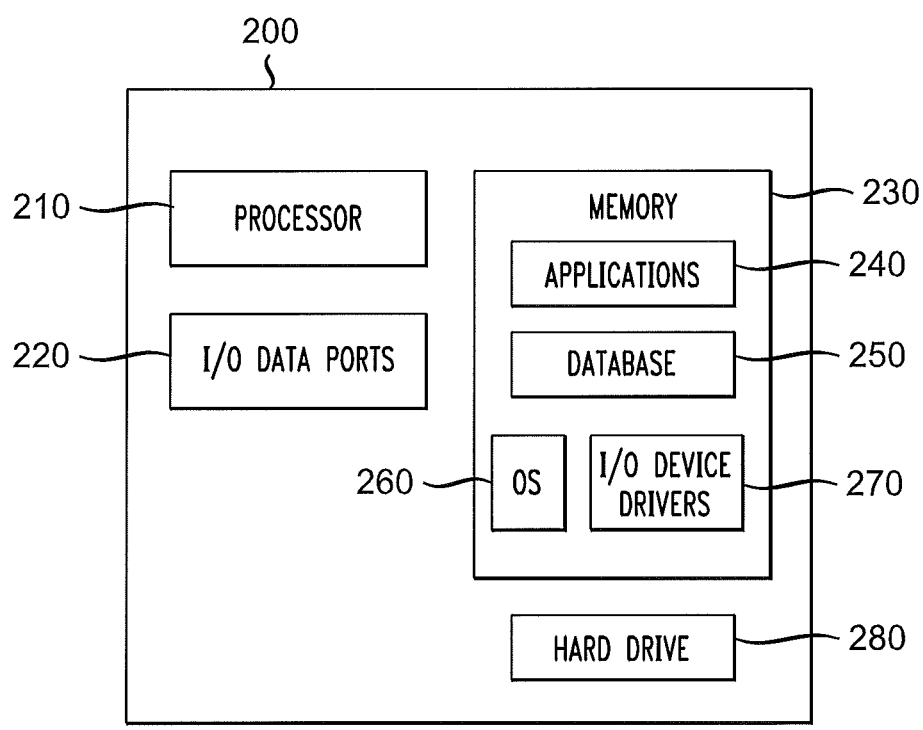
FIG. 2 illustrates a block diagram of a computing device with which a business intelligence application server may be implemented according to an illustrative embodiment.

FIG. 2 illustrates a block diagram of a computing device with which the business intelligence application server 120 may be implemented according to illustrative embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, include non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the components shown in FIG. 2 is a block diagram of a computing device 200 with which the business intelligence application server 120 shown in FIG. 1 may be implemented. According to an illustrative embodiment, the computing device 200 may be implemented in any suitable computing device and on any suitable network. For example, the computing device 200 may be implemented as a server in the network 160 in communication with the communication devices 110A and 110B, the SDN controller 150, and the third party servers/ databases 170 over, e.g., Internet connections.

Referring to FIG. 2, the computing device 200 includes a processor 210. The processor 210 can be any commercially available or custom microprocessor. Although only one processor 210 is shown for simplicity of illustration, it should be appreciated that there may be multiple processors, which could include distributed processors or parallel processors in a single machine or multiple machines. The processor 210 may be used in supporting a virtual processing environment. Also, the processor 210 may include a state machine, an application specific integrated circuit (ASIC), programmable gate array (PGA) including a Field PGA, or state machine.

The processor 210 executes instructions stored in the memory 230 to perform operations. It should be appreciated that performance of these operations may include the processor 210 performing the operations directly and/or facilitating, directing, or cooperating with another device or component to perform the operations.

Referring again to FIG. 2, the processor 210 receives opt-in communications from the communication devices 110A and 110B via I/O Data Ports 220. The processor 210 also generates and transmits requests for data having predetermined attributes to the SDN controller 150 and receives the requested data via the I/O Data Ports 220.

According to an illustrative embodiment, the processor 210 analyzes the retrieved data, e.g., to determine trends in the data as described above. The processor 210 transmits requested data to third party servers and databases 170 via the I/O Data Ports 220. The I/O Data Ports 220 can be implemented with, e.g., an interface including an antenna or other suitable type of transceiver through which data and signals may be transmitted and received wired and/or wirelessly.

The computing device 200 also includes a physical hard drive 280. The processor 210 communicates with the memory 230 and the hard drive 280 via, e.g., an address/data bus (not shown). The memory is 230 is representative of the overall hierarchy of memory devices containing the software and data used to implement the functionality of the device 200. The memory 230 can include, but is not limited to the types of memory devices described above. As shown in FIG. 2, the memory 230 may include several categories of software and data used in the device 200, including applications 240, a database 250, an operating system (OS) 260, and input/output (I/O) device drivers 270.

The I/O device drivers 270 may include various routines accessed through at least one of the OS 260 by the applications 240 to communicate with devices and certain memory components.

The applications 240 can be stored in the memory 230 and/or in a firmware (not shown) as executable instructions, and can be executed by the processor 210. The applications 240 include various programs that implement the various features of the device 200. The applications 240 may include an application for requesting data having predefined attributes within session flows, determining trends in the collected data, and sharing the data and information reflecting the trends with the third party servers and databases 170.

The database 250 represents the static and dynamic data used by the applications 240, the OS 260, the I/O device drivers 270 and other software programs that may reside in the memory 230. The database 250 may be used to store, e.g., attributes defining what data is to be requested, retrieved data, determined data trends, etc.

While the memory 230 is illustrated as residing proximate the processor 210, it should be understood that at least a portion of the memory 230 can be a remotely accessed storage system, for example, another server on network 160, a remote hard disk drive, a removable storage medium, combinations thereof, and the like. Thus, any of the data, applications, and/or software described above can be stored within the memory 230 and/or accessed via network connections to other data processing systems (not shown) that may include a local area network (LAN), a metropolitan area network (MAN), or a wide area network (WAN), for example.

Although not illustrated, it should be appreciated that the SDN controller 150 may be implemented with a computing device similar to that shown in FIG. 2. For example, the SDN controller 150 may contain a processor and a memory having applications including instructions which, when executed by the processor, cause the processor to perform operations for selecting network elements, retrieving requested data from the network elements, providing the retrieved data to the business intelligence application server 120, performing deep packet inspection on the network elements, and communicating with the network administrator 180 as described above.

Figure 3:
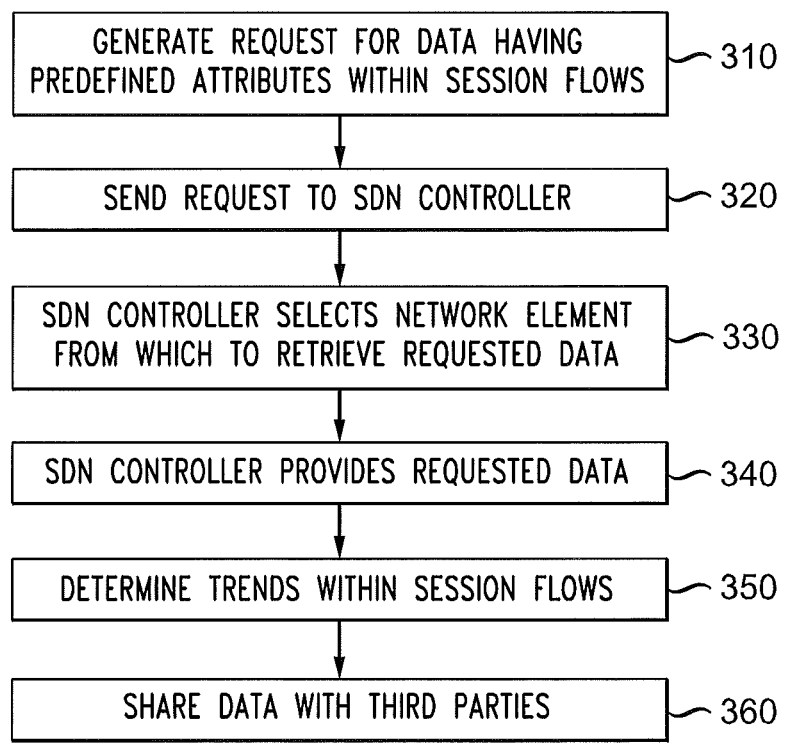
FIG. 3 illustrates a method for collecting and sharing information associated with session flows between communication devices servers according to illustrative embodiments.

FIG. 3 illustrates a method for collecting information within session flows between communication devices and web servers according to an illustrative embodiment. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 3, the method begins at step 310 at which a request is generated for data having predefined attributes within session flows between multiple communication devices, such as the communication devices 110A and 110B, and at least one web server, such as the web servers 140A and 140B. The request may be generated by the business intelligence application server 120, e.g., in response to an inquiry for such data from a third party. Such a request may be generated in real-time in response to the inquiry. Alternatively, the business intelligence application server 120 may generate such requests based on predefined rules.

At step 320, the request for the data is sent to the SDN controller 150 via, e.g., the Internet connection 155. At step 330, the SDN controller 150 selects a network element from which to retrieve the requested data. For example, the SDN controller 150 may select the network element 135A and/or 130A o retrieve data from a session flow between the communication device 110A and the web server 140A, and the SDN controller 150 may select the network element 135B and/or 130B to retrieve data from a session flow between the communication device 110B and the web server 140B.

At step 340, the SDN controller 150 retrieves the requested data, and at step 350 the SDN controller 150 provides the requested data to the business intelligence application server 120. The business intelligence application server 120 may analyze the requested data, e.g., to determine trends in the data, at step 350. At step 360, the business intelligence application server 120 forwards the requested data and the results of analysis to the third party servers and databases 170. This may occur automatically in real time or periodically or upon request by a third party.

There are many benefits associated with the network based business intelligence application described above. For example, this technique may easily expanded to collect data from different network sources, agnostic of network technology used by any particular user, such as a Virtual Private Network (VPN), the Internet, remote access, wireless connections, etc. This technique does not require expensive network monitoring solution deployment. The information obtained using the business intelligence application can be used to create innovative and revenue generating applications in different contexts e.g., a consumer service context, an enterprise application context, etc.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
generating, by a processor of a business intelligence application server, a request to obtain data having predefined attributes from within session flows occurring between a plurality of communication devices and a merchant web server over a communication network that comprises a plurality of network elements controlled by a software defined networking controller, wherein the predefined attributes comprise a merchant browsing history for each of the session flows occurring between the plurality of communication devices and the merchant web server;
sending the request to the software defined networking controller, wherein the software defined networking controller has access to information indicating a set of network elements of the plurality of network elements within the communication network traversed by the session flows, and wherein the software defined networking controller selects a network element from among the set of network elements traversed by the session flows and retrieves the data from the network element;
receiving the data from the software defined networking controller; and
sharing the data with a third party who is different from a merchant associated with the merchant web server.

2. The method of claim 1, further comprising receiving opt-in messages from the plurality of communication devices; and wherein generating the request comprises generating the request in response to receiving the opt-in messages from the plurality of communication devices.

3. The method of claim 1, wherein the request is to further obtain data having the predefined attributes within session flows occurring between the plurality of communication devices and a plurality of merchant web servers via a plurality of communication networks.

4. The method of claim 1, wherein the predefined attributes further comprise information identifying each of the plurality of communication devices and a user of each of the plurality of communication devices during the session flows.

5. The method of claim 1, wherein the request is to further obtain information regarding applications used by each of the plurality of communication devices during the session flows.

6. The method of claim 1, further comprising determining trends within the session flows based on the data.

7. The method of claim 1, wherein sharing the data with the third party comprises sharing the data with the third party via an application programming interface.

8. The method of claim 1, wherein the merchant is associated with a merchant web site hosted by the merchant web server, and wherein the merchant browsing history comprises names of different merchants associated with a plurality of different merchant websites visited, a length of time each of the plurality of different merchant websites was visited, and information indicating at least one product or service viewed during visitation of each of the plurality of different merchant web sites visited.

9. A business intelligence application server, comprising:
a processor; and
memory having stored thereon instructions which, when executed by the processor, cause the processor to perform operations comprising:
generating a request to obtain data having predefined attributes from within session flows occurring between a plurality of communication devices and a merchant web server over a communication network that comprises a plurality of network elements controlled by a software defined networking controller, wherein the predefined attributes comprise a merchant browsing history for each of the session flows occurring between the plurality of communication devices and the merchant web server;
sending the request to the software defined networking controller, wherein the software defined networking controller has access to information indicating a set of network elements of the plurality of network elements within the communication network traversed by the session flows, and wherein the software defined networking controller selects a network element from among the set of network elements traversed by the session flows and retrieves the data from the network element;
receiving the data from the software defined networking controller; and
sharing the data with a third party who is different from a merchant associated with the merchant web server.

10. The business intelligence application server of claim 9, wherein the operations further comprise receiving opt-in messages from the plurality of communication devices; and wherein generating the request comprises generating the request responsive to receiving the opt-in messages from the plurality of communication devices.

11. The business intelligence application server of claim 9, wherein the request includes a request for data having the predefined attributes within session flows occurring between the plurality of communication devices and a plurality of merchant web servers via a plurality of communication networks.

12. The business intelligence application server of claim 9, wherein the predefined attributes further comprise information identifying each of the plurality of communication devices and a user of each of the plurality of communication devices during the session flows.

13. The business intelligence application server of claim 9, wherein the request is to further obtain information regarding applications used by each of the plurality of communication devices during the session flows.

14. The business intelligence application server of claim 9, wherein the operations further comprise determining trends within the session flows based on the data.

15. The business intelligence application server of claim 9, wherein the sharing the data to the third party comprises sharing the data with the third party via an application programming interface.

16. The business intelligence application server of claim 9, wherein the merchant is associated with a merchant website hosted by the merchant web server, and wherein the merchant browsing history comprises names of different merchants associated with a plurality of different merchant websites visited, a length of time each of the plurality of different merchant websites was visited, and information indicating at least one product or service viewed during visitation of each of the plurality of different merchant websites visited.

17. A computer readable storage device having instructions stored thereon which, when executed by a processor of a business intelligence application server, cause the processor to perform operations comprising:
generating a request to obtain data having predefined attributes from within session flows occurring between a plurality of communication devices and a merchant web server over a communication network that comprises a plurality of network elements controlled by a software defined networking controller, wherein the predefined attributes comprise a merchant browsing history for each of the session flows occurring between the plurality of communication devices and the merchant web server;
sending the request to the software defined networking controller, wherein the software defined networking controller has access to information indicating a set of network elements of the plurality of network elements within the communication network traversed by the session flows, and wherein the software defined networking controller selects a network element from among the set of network elements traversed by the session flows and retrieves the data from the network element;
receiving the data from the software defined networking controller; and
sharing the data with a third party who is different from a merchant associated with the merchant web server.

18. The computer readable storage device of claim 17, wherein the operations further comprise receiving opt-in messages from the plurality of communication devices; and wherein generating the request comprises generating the request responsive to receiving the opt-in messages from the plurality of communication devices.

19. The computer readable storage device of claim 17, wherein the request is to further obtain data having the predefined attributes within session flows occurring between the plurality of communication devices and a plurality of merchant web servers via a plurality of communication networks.

20. The computer readable storage device of claim 17, wherein the predefined attributes further comprise information identifying each of the plurality of communication devices and a user of each of the plurality of communication devices during the session flows.

21. The computer readable storage device of claim 17, wherein the operations further comprise determining trends within the session flows based on the data.

22. The computer readable storage device of claim 17, wherein sharing the data with the third party comprises sharing the data with the third party via an application programming interface.

* * * * *